(12) United States Patent
Zapf

(10) Patent No.: US 8,702,898 B2
(45) Date of Patent: Apr. 22, 2014

(54) METHOD FOR CONNECTING TWO JOINING PARTNERS

(75) Inventor: Lothar Zapf, Alzenau (DE)

(73) Assignee: Vacuumschmeize GmgH & Co. KG, Hanau (DE)

( * ) Notice: Subject to any disclaimer, the term of this patent is extended or adjusted under 35 U.S.C. 154(b) by 759 days.

(21) Appl. No.: 12/598,848

(22) PCT Filed: Jun. 1, 2007

(86) PCT No.: PCT/EP2007/004895
§ 371 (c)(1),
(2), (4) Date: Mar. 2, 2010

(87) PCT Pub. No.: WO2008/148402
PCT Pub. Date: Dec. 11, 2008

(65) Prior Publication Data
US 2010/0164308 A1 Jul. 1, 2010

(51) Int. Cl.
| | | |
|---|---|---|
| H02K 15/12 | (2006.01) | |
| B32B 37/02 | (2006.01) | |
| B32B 38/16 | (2006.01) | |
| B29C 65/52 | (2006.01) | |
| H02K 15/03 | (2006.01) | |
| H02K 1/28 | (2006.01) | |

(52) U.S. Cl.
USPC ..... 156/330; 156/307.3; 310/45; 310/156.21; 29/598

(58) Field of Classification Search
USPC ........ 156/307.3, 330; 29/598; 310/45, 156.21
See application file for complete search history.

(56) References Cited

U.S. PATENT DOCUMENTS

| | | |
|---|---|---|
| 2,809,184 A | 10/1957 | Langer |
| 4,190,686 A | 2/1980 | Muis |
| (Continued) | | |

FOREIGN PATENT DOCUMENTS

| | | |
|---|---|---|
| CN | 1520448 A | 8/2004 |
| CN | 1798817 A | 7/2006 |
| (Continued) | | |

OTHER PUBLICATIONS

International Search Report dated Jan. 14, 2008 for International Application No. PCT/EP2007/004895.

(Continued)

*Primary Examiner* — Michael Orlando
*Assistant Examiner* — Daniel Lee
(74) *Attorney, Agent, or Firm* — Dickinson-Wright LLP

(57) ABSTRACT

A method for connecting a first joining partner to a second joining partner. After provision of the first joining partner and the second joining partner, a lacquer layer is applied to the first joining partner. Then the first joining partner and the second joining partner are saturated together with an impregnating resin. The lacquer layer is produced from a lacquer composition based on an epoxy resin mixture, a curing accelerator, a silane-based, epoxy-functional bonding agent, and a solvent. The epoxy resin mixture has 10 wt.-% to 94 wt.-% of at least one solid epoxy resin with a maximum epoxy count of 2 Eq/kg, 1 wt.-% to 50 wt.-% of at least one solid, multifunctional epoxy resin with an epoxy count >4 Eq/kg, and 5 wt.-% to 40 wt.-% of a phenol and/or kresol novolak with a melting point >30° C. After impregnation, the viscosity of the impregnating resin is reduced such that the first joining partner and the second joining partner are connected to one another.

49 Claims, 6 Drawing Sheets

(56) References Cited

U.S. PATENT DOCUMENTS

| | | | |
|---|---|---|---|
| 5,731,369 A | 3/1998 | Mahoney | |
| 6,555,601 B1 * | 4/2003 | Behm et al. | 523/435 |
| 2007/0261790 A1 | 11/2007 | Pouchelon et al. | |

FOREIGN PATENT DOCUMENTS

| | | |
|---|---|---|
| CN | 1922253 A | 2/2007 |
| DE | 1 041 689 B | 10/1958 |
| DE | 28 47 988 A1 | 5/1980 |
| DE | 43 23 656 A1 | 1/1995 |
| DE | 102004058451 A1 | 6/2006 |
| DE | 102004058451 A1 | 6/2006 |
| DE | 10 2006 012 839 A1 | 9/2007 |
| EP | 0240459 A | 10/1987 |
| JP | 200260674 A | 2/2002 |
| JP | 2002272033 A | 9/2002 |
| JP | 2003246838 A | 9/2003 |
| JP | 2000513036 A | 10/2004 |
| WO | 0231065 A2 | 4/2002 |
| WO | 03000816 A1 | 1/2003 |
| WO | 2005071006 A1 | 8/2005 |

OTHER PUBLICATIONS

Office Action dated Jun. 7, 2011 for German Patent Application No. 11 2007 003 450.5, and English Translation of the same.

* cited by examiner

FIG. 4
FIG. 5
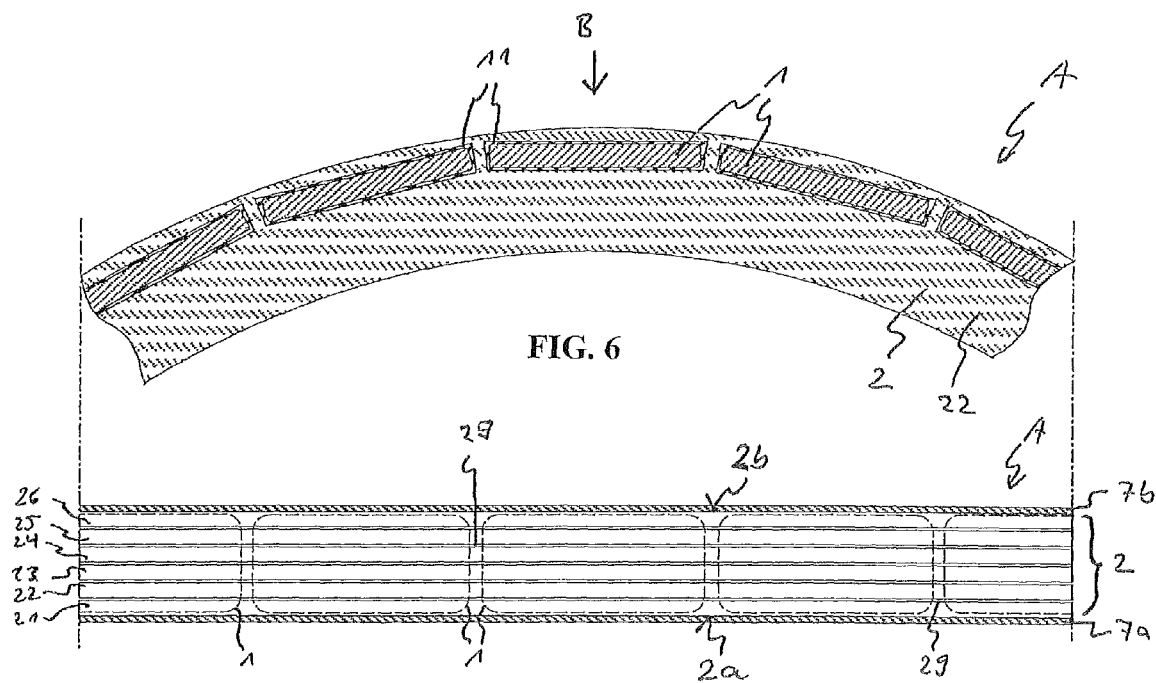
FIG. 6
FIG. 7

METHOD FOR CONNECTING TWO JOINING PARTNERS

BACKGROUND

1. Field

Disclosed herein is a method for bonding two or more bonding partners. The bonding partners may be, for example, permanent magnets or magnetizable bodies pocketed in a substrate, e.g. a substrate body of a rotor to be produced, for instance where used, among other things, as the rotor of a permanent magnet synchronous machine (PMSM).

2. Description of Related Art

Bonds of this kind involving two or more bonding partners are often exposed to high mechanical and/or thermal stress, whilst rotors of this kind are often run at high speeds, for example, exceeding 5,000 rpm, resulting in correspondingly high centrifugal forces further stressing the bond.

Producing a durable bond usually involves metering a liquid adhesive, for example a single or two-component resin into pockets of a substrate body mainly consisting of a laminated sheet metal core, after which the magnets are pressed into the liquid adhesive so that each magnet is pocketed in the substrate enveloped in adhesive.

This technique has, however, a number of disadvantages. For one thing, in order to meter the adhesive, each and every pocket has to be accessed with a metering needle. In addition to this, metering is problematic because of the tight tolerances on the dimensions of the pockets. When not enough adhesive is injected in a pocket, the magnet fails to be totally enveloped, resulting in gaps forming between the laminate and the magnet in which corrosion can form. On the other hand, when too much adhesive is injected the weepage adhesive emerging from the gap between the pocket and the substrate body needs to be removed so that the finished rotor has no accumulation of adhesive in the region of the pocket opening.

For another thing, there is the problem of the adhesive shrinking, when cured, to such an extent that stress can rupture the bond when the resulting device is used at high speeds.

An alternative known technique for locating magnets in such a substrate body is to equip the empty pockets of the substrate body with magnets before impregnating the pockets in place with resin. The trouble here is, however, that the impregnating resin needs to be cured hot, refluidizing the already solid but still uncured impregnating resin, causing it to run out of the substrate body in part, forming dribble that needs to be sanded off of the surface of the body.

SUMMARY

In view of the above, there remains a need to provide a simple method for producing a solid and durable bond between two or more bonding partners. One or more of the embodiments disclosed herein satisfies this need.

In one embodiment, the method for bonding a first bonding partner to a second bonding partner disclosed herein includes, as a first step, making the bonding partners available. After this, a lacquer coating is applied to the first bonding partner. This lacquer coating may cover the surface of the first bonding partner totally or partially. Applying the lacquer coating to the first bonding partner may be done, for example, by dip, spray or brush application.

Optionally, in a particular embodiment the second bonding partner may comprise a recess provided to receive the coated first bonding partner totally or partially. For this purpose in this embodiment the coated first bonding partner is inserted in the recess of the second bonding partner totally or partially. In this arrangement the recess may be configured so that it matches the shape of the first bonding partner, i.e. resulting in a gap between the second bonding partner and the coated first bonding partner inserted in the recess totally or partially, the width of the gap not exceeding a predefined value, for example maximally 1 mm, at no location of the gap. Inserting the first bonding partner into the recess can be timed so that the lacquer coating is in the B-condition or C-condition. In the B-condition the lacquer coating is partly cross-linked, i.e. the lacquer is still not fully cured, whereas in the C-condition, the lacquer coating is fully cured.

The assembly comprising the second bonding partner and the coated first bonding partner inserted totally or partially in the recess in the second bonding partner is then impregnated with the resin, filling out any existing cracks, openings or interstices. More particularly, the impregnating resin fills out the gap between the first bonding partner and the second bonding partner. To minimize the risk of air becoming trapped in the impregnating resin, impregnation can be done at a reduced ambient pressure, e.g. at an absolute pressure below 1 hPa. Achieving such a reduced ambient pressure is possible, for example, by means of a rotary spool oil pump.

After impregnation, the viscosity of the impregnation resin is reduced at least to the extent that the first bonding partner and second bonding partner are interbonded sufficiently solidly. On transfer into the curing oven the impregnation resin may still be liquid. Preventing weepage thereof can be done by capillary forces as existing between adjoining metal sheets of the laminate and/or by means of one or more closure elements, for example rubber mats covering any cracks, openings or interstices.

BRIEF DESCRIPTION OF THE DRAWINGS

The method disclosed herein will now be illustrated by way of example embodiments with reference to the attached drawings in which:

FIG. 4 is a schematic view of one embodiment of a magnet or a magnetizable body for insertion into the opening of the substrate body closed off at one side as shown in FIG. 3, FIG. 5 is a schematic view of the magnet or the magnetizable body as shown in FIG. 4 after application of a lacquer coating as described herein, FIG. 6 is a cross-sectional view of the section of the substrate body as shown in FIG. 2 through one of the metal sheets showing a coated magnet or magnetizable body as shown in FIG. 5 that has been inserted in each opening as shown in FIG. 2, FIG. 7 is a view of the section of the substrate body as shown in FIG. 6 as viewed in the direction B showing how the insertion openings for the coated magnets or coated magnetizable bodies are closed off by means of an adhesive film.

DETAILED DESCRIPTION OF SPECIFIC EMBODIMENTS

Figure 1:
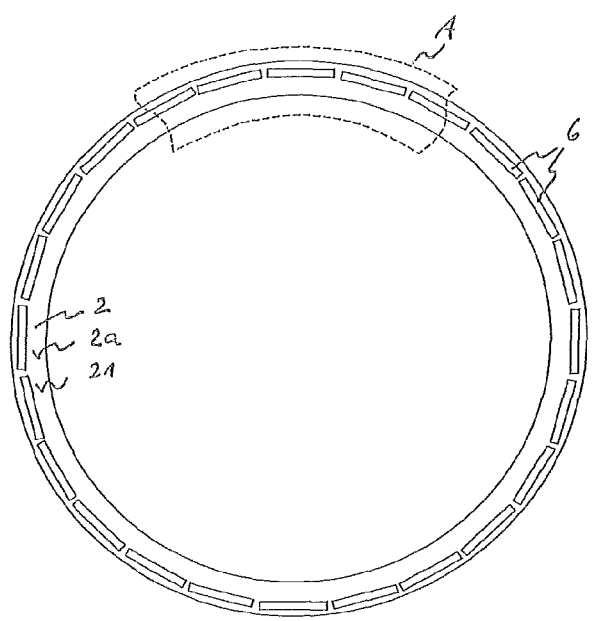
FIG. 1 is a schematic side view of one embodiment of a substrate body of a rotor to be produced for a permanent magnet synchronous machine, the substrate body comprising openings configured as pockets to receive magnets or magnetizable bodies.

The lacquer coating applied to the first bonding partner is produced from a special composition achieving a solid bond between the first and second bonding partners, it comprising an epoxy resin mixture, a curing accelerator, a silane-based epoxy functional adhesion promoter and a solvent, the epoxy resin mixture comprising 10 to 94% by weight of at least one solid epoxy resin with an epoxide number not exceeding 2 Eq/kg, 1 to 50% by weight of at least one solid multifunctional epoxy resin with an epoxide number >4 Eq/kg, as well as 5 to 40% by weight of a phenol and/or cresol novolak with a melting point >30° C. The above weight percentages are based on the weight of the epoxy mixture.

In addition to this special epoxy resin mixture the lacquer composition contains a curing accelerator, for example tertiary amines or imidazole derivatives, one curing accelerator being e.g. 2-ethyl-4-methylimidazol. To ensure the wanted bond of the lacquer on the permanent magnet material the lacquer composition additionally includes a silane-based epoxy functional adhesion promoter, γ-glycidyloxypropyltrimethoxysilane or β-(3,4-epoxycyclohexyl)-ethyltrimethoxysilane having demonstrated to be an advantage. The adhesion promoters may be employed for example in a quantity of 0.1% by weight to 5% by weight, preferably 1% by weight to 3% by weight in relation to the epoxy resin mixture, i.e., based on the weight of the epoxy resin mixture.

Suitable solvents for the lacquer are for example aliphatic and aromatic hydrocarbons, ethers, esters, glycol ethers, alcohols, ketones and/or mixtures of two or more of these substances. Applying the lacquer to the components themselves is conventionally done by brush, dip, spray, spin, pouring or some other method, preference being given to spray application both on the fly and in bulk due to the geometry of the first bonding partner to be coated. For this reason it is expedient when the solid content of the lacquer is not too high. Thus the solids content of the lacquer may be maximized, for example, to 50% by weight or range between 10% by weight and 20% by weight based upon the weight of the lacquer composition. In one variant of the lacquer composition the epoxy resin mixture contains 1% by weight to 80% by weight (based on the weight of the epoxy resin mixture) of a solid epoxy resin having an epoxide number ranging from 1 Eq/kg to 2 Eq/kg.

In another variant the lacquer composition contains 40% by weight to 60% by weight of a solid epoxy resin with an epoxide number smaller than 1 Eq/kg, 20% by weight to 40% by weight of a solid epoxy resin having an epoxide number ranging from 1 Eq/kg to 2 Eq/kg, 10% by weight to 40% by weight of a solid multifunctional epoxy resin having an epoxide number exceeding 4 Eq/kg and 10% by weight to 20% by weight of a phenol and/or cresol novolak lacquer. The above weight percentages are based on the weight of the epoxy resin mixture. Suitable as solid epoxy resins having an epoxide number of at most 2 Eq/kg are, for example, bisphenol-A and/or bisphenol-F based epoxy resins.

In another variant the multifunctional epoxide resin has an epoxide number exceeding 4 Eq/kg and belongs to the group comprising epoxy phenol novolaks, epoxy cresol novolaks and triglycidyl isocyanurates and/or a mixture of two or more of these substances.

To improve its corrosion protection properties the lacquer composition may include corrosion protection additives such as e.g. zinc phosphate, zinc chromate or zinc hydroxy phosphite.

The lacquer composition can be further optimized by including additional additives such as e.g. soluble dyestuffs, levelling agents and defoamants, non-metallic fillers such as e.g. silica flour, mica and talcum, dispersible pigments such as e.g. carbon black, rutile, as well as dispersion aids and/or rheological additives and/or deposition aids such as e.g. bentonites or aerosils, in the lacquer composition.

The impregnation resin used may be for example a resin featuring a viscosity ranging, for example, from 50 mPa·s to 1000 mPa·s or, for example, from 200 mPa·s to 300 mPa·s at a temperature of 25° C. which is stable in storage over a lengthy period e.g. 1 month and curing of which is triggered by elevating the temperature. A suitable impregnation resin comprises a resin component, a curing component as well as an optional curing accelerator. A suitable resin component is for example a bisphenol-A or bisphenol-F based epoxy resin or a mixture of the two, which is liquid at 20° C. To reduce the viscosity, an epoxy-functional thinner e.g. butane dioldiglycidylether can be added to the impregnation resin. An anhydride curing agent, e.g. a thin dicarbonic acid anhydride, may serve as the curing component whilst a suitable curing accelerator may be e.g. an imidazole derivative and/or bortrichloride amine system. A suitable thin dicarbonic acid anhydride is methyl-cyclohexane-dicarbonic acid anhydride.

Curing such impregnation resins shrinks their volume by, for example, less than 2%, whereas conventional non-saturated polyester impregnation resins have a typical shrinkage exceeding 5%. This special impregnation resin forms with the lacquer coating of the magnets high-strength covalent bonds which are much stronger than simple bonds by dipole alternation as is the case with conventional impregnation resins.

Hitherto the present method has been described by way of producing a bond between two bonding partners. However, it is just as possible to use the method for bonding more than two bonding partners. The method disclosed now makes it possible, for example, to produce by a few simple steps in the method segmented magnet systems excelling by the bonding strength between the bonding partners, excellent insulation properties whilst featuring very good high-temperature performance and excellent corrosion protection.

Such magnet systems can be produced, for example, from two or more permanent magnets or magnetizable bodies bonded as a first bonding partner to a second bonding partner configured as a common substrate body. In production of such magnet systems, the lacquer-coated permanent magnets or magnetizable bodies are inserted in corresponding recesses in the substrate body where they can be optionally fixedly located and bonded to the substrate body as explained. Where a substrate body configured as a laminated core is involved, a solid bond also materializes especially between the metal sheets since the impregnation resin gains access therebetween. In addition, the metal sheets are enveloped by the impregnation resin to thus be electrically insulated from each other and protected from corrosion. This electrical insulation also suppresses eddy currents as may materialize across the metal sheets due to electromagnetic alternating fields.

The method will be more clearly understood by reference to the following examples, which are intended to illustrate, but not to limit, the scope of the appended claims.

Example 1

Producing a Lacquer Solution 25 g of a bisphenol A solid resin having an epoxide number of 0.3 Eq/kg, 10 g of a bisphenol A resin with an epoxide number of 1.5 Eq/kg, 8 g of a epoxy phenol novolak having an epoxide number of 5.6 Eq/kg as well as 7 g of a cresol novolak having a melting point of 120° C. were dissolved in 200 g of solvent mixture comprising three parts methylethyl ketone and one part ethanol. Added to this solvent were 0.25 g 2-ethyl-4-methylimidazole and 0.5 g γ-glycidyloxypropyltrimethoxysilane. The resulting clear lacquer solution is a lacquer composition as described above, suitable for use as a lacquer or lacquer coating for the further example applications.

Example 2

Producing Black of Magnets and Insulation Test

The lacquer produced in example 1 was applied by spray gun to permanent magnet cubes of an alloy of neodymium, iron and boron. The magnet cubes dimensioned 50 mm×12 mm×5 mm were then dried at 50° C. for 30 minutes. The thickness of the lacquer coat after drying was approx 15 to 25 μm. Eight each of the cuboidal magnets were assembled with the aid of a clamping device into a block, the contact surface area of which was 50 mm×12 mm. The thus fabricated magnet system was cured in a recirculating air oven for 3 hrs at 150° C.

The hardest magnet blocks were then subjected to a continuity test, requiring the bonded block to be freed of the lacquer coating on one side by being sandpapered off for application of a DC voltage of 30 V to make sure that all bonds feature excellent insulation with no creepage current.

Example 3

Corrosion Test

Five of the magnet blocks produced as per example 2 were subjected to a corrosion test at 130° C., with a humidity of 100% and a pressure of 2.7 bar in an autoclave. Even after seven whole days of testing (168 hrs) no signs of corrosion were apparent and no delamination was evident.

Example 4

Salt Spray Test

Five of the magnet blocks produced in example 2 were subjected to a salt spray test as per DIN 50021. Even after testing for 240 hrs the magnet blocks showed no signs of corrosion.

Example 5

Emission Test

Five magnet blocks produced by the method in example 2 were subjected to emission testing as per DIN 50018. Even after 21 test cycles no corrosive attack of the lacquer or magnet material was found.

Example 6

Thermal Stability of Lacquer

The lacquer produced as per example 1 was subjected, cured, to thermogravimetric analysis at an increase in temperature of 5 K/min. Decomposition occurred at a temperature of 410° C. meaning that the lacquer is cleared for all high-temperature applications with NdFeB magnets. The upper limit for high-temperature applications for the material itself is max. 210° C., above which irreversible heat losses have to be reckoned with.

Example 7

Adhesive Strength

A magnet plate produced by the method in example 2 was exposed to a compression shear test, resulting in the magnet material breaking at 15,000 N with no rupture of the adhesive bond itself.

Example 8

Compression Shear Testing

Compression shear tests as per DIN 54451 were carried out on an adhesive lacquer used as per example 1. Results confirmed that the compression shear strength was better than 25 $N/mm^2$ for the magnet-to-magnet bonds at room temperature. Even at 130° C. the compression shear strength still exceeded 5 $N/mm^2$.

Example 9

Producing a Bond Between Two Bonding Partners

Referring now to FIG. 1 there is illustrated a particular embodiment of how a substrate body 2 is provided. FIG. 1 shows an example (in a front view) explaining the method disclosed herein by way of an example of producing a rotor for permanent magnet synchronous machines. The substrate body 2 comprises a sheet metal laminate of which only the metal sheet 21 evident at the front side 2a is shown in this view. Each metal sheet may be configured for example as a ring, e.g. a cylindrical ring. In addition, the metal sheets feature a series of azimuthally equispaced openings, for instance. Each of the metal sheets forming the laminate may be identically shaped.

The individual metal sheets are configured with their openings so that openings 6 are configured in the substrate body 2 when the sheets are assembled together. The openings 6 extend from the front side 2a of the substrate body 2 to the rear side opposite the front side 2a. These openings may be selected optionally shaped depending on the corresponding requirements of the magnet system to be produced and may thus deviate from the rectangular shape shown in cross-section. For instance, the openings may be circular in cross-section.

Figure 2:
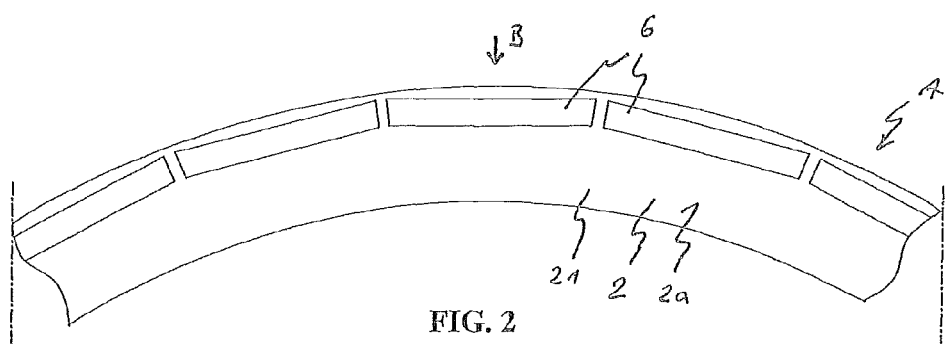
FIG. 2 is a magnified view of a section A of the substrate body as shown in FIG. 1.
Figure 3:
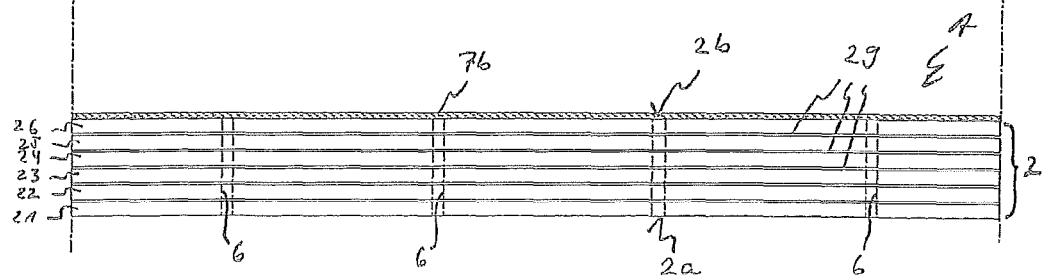
FIG. 3 is a view of the section of the substrate body as shown in FIG. 2 as viewed in the direction B showing how the substrate body comprises a sheet metal laminate, an annular punched adhesive film having been applied to one side of the substrate body in addition to the view as shown in FIG. 2 to seal off the opening.

Referring now to FIG. 2 there is illustrated a section A of the substrate body 2 on a magnified scale, a side view of which is shown in FIG. 3 in a viewing direction B as evident from FIG. 2. Clearly evident in FIG. 3 are the individual metal sheets 21, 22, 23, 24, 25, 26 of the substrate body 2, the number of which can be optionally selected. Interstices 29 may exist between the metal sheets 21, 22, 23, 24, 25, 26 to be later filled with impregnation resin.

Referring now to FIG. 3 there is illustrated how the positions of the sides of the openings 6 facing the outer side of the annular substrate body 2 are depicted dashed, it being evident from this view that the openings 6 fully extend from a front side 2a of the substrate body 2 to its rear side 2b opposite the front side 2a.

Not shown in FIG. 2, but shown in FIG. 3, an annular punched adhesive film 7b is applied to the rear side 2b of the substrate body 2 to close off the openings 6 at one side. The adhesive film 7b may be configured, as shown, in one piece, but it is just as possible to use sections of an adhesive film 7b instead of one adhesive film 7b covering all the openings, each section closing off just one or more of the openings 6 at one side.

Starting at the front side 2a, magnets 1 (shown in FIG. 4 and FIG. 5) are then inserted in the openings 6. Instead of magnets 1, magnetizable bodies could also be provided. Because whether the inserted object is a magnet or a magnetizable body is irrelevant for producing the bond to the substrate body 2, reference is made only to "magnets" hereinafter. However, where magnetizable bodies are concerned, they would have to be magnetized at some later point in time (e.g., after curing of the bond to be produced).

Referring now to FIG. 4, there is illustrated one such magnet 1 in cross-section. Before being inserted into the openings 6 the magnets 1 are coated fully or partly with a lacquer coating 11, as is evident from FIG. 5. The composition of the lacquer coating 11 used is the same as explained above. Applying the lacquer coating 11 to the magnet 1 can be done, for example, by dip, spray or brush application. The point in time of inserting the magnets 1 into the openings 6 can be selected so that the lacquer coating 11 is in the A-condition, B-condition or C-condition. Those of skill in the art will understand that the term "A-condition" refers to an uncrosslinked state, that the term "B-condition" refers to a partly cross-linked state, and that the term "C-condition" refers to a fully crosslinked or cured state. The magnets 1 are held in place in the openings 6 by being closed off at the rear by the adhesive film 7b.

Referring now to FIG. 6 there is illustrated a cross-section through the section A of the substrate body 2 including the lacquered magnets 1 now pocketed in the openings. After insertion of the magnets 1 the openings are closed off also at the front side 2a by means of an adhesive film 7a, as is evident from FIG. 7 (in a view corresponding to that of FIG. 3). The adhesive films 7a and 7b have the task of preventing the magnets 1 from slipping out of place. A view of the front side 2a of the complete substrate body 2 now fitted with the magnets 1 and provided with the adhesive films 7a, 7b is shown in FIG. 8 (in a view corresponding to that as shown in FIG. 1).

Figure 8:
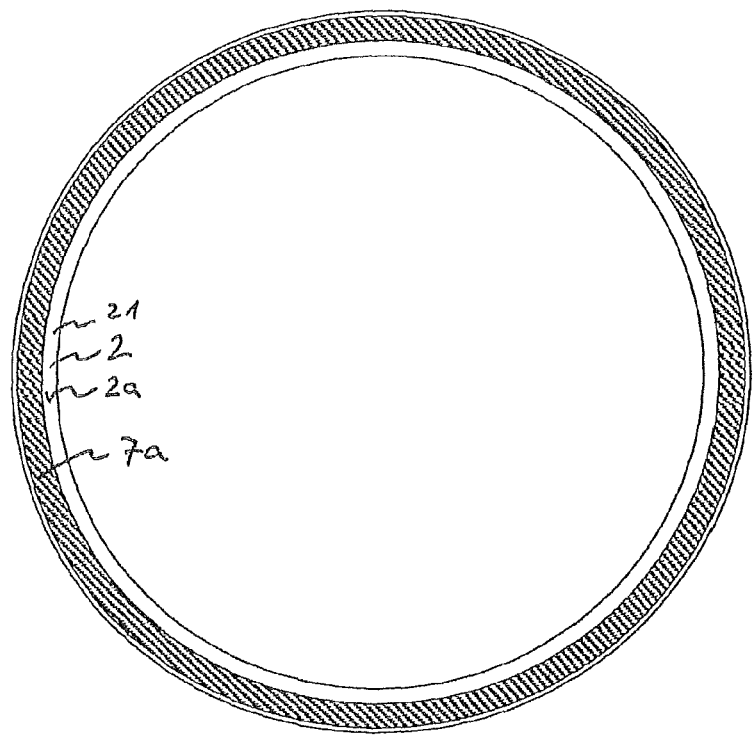
FIG. 8 is a schematic side view of the substrate body provided with the coated magnets or coated magnetizable bodies and closed off by the adhesive film.

In a departure from the illustration as shown in FIG. 8 the front side 2a may be totally closed off by a single adhesive film 7a. In the same way the rear side 2b (see FIGS. 3 and 7) may also be fully closed off by the adhesive film 7b. The advantage of this is that when later impregnating the assembly with an impregnation resin there is no weepage of the impregnation resin from the gap between the magnets 1 and the substrate body 2. Apart from this, the adhesive films 7a, 7b can be stripped from the front side 2a and rear side 2b respectively once an adequate amount of impregnation resin has been applied, so that the front side 2a and rear side 2b of the substrate body 2 features, in the portion over which the adhesive films 7a and 7b respectively were stuck, an even surface not wetted by the impregnation resin. To also provide corrosion protection for the sections of the front side 2a, rear side 2b located under the adhesive films 7a, 7b, respectively, a layer of the impregnation resin or some other suitable lacquer can be optionally applied to the assembly after stripping off the adhesive films 7a, 7b.

Figure 9:
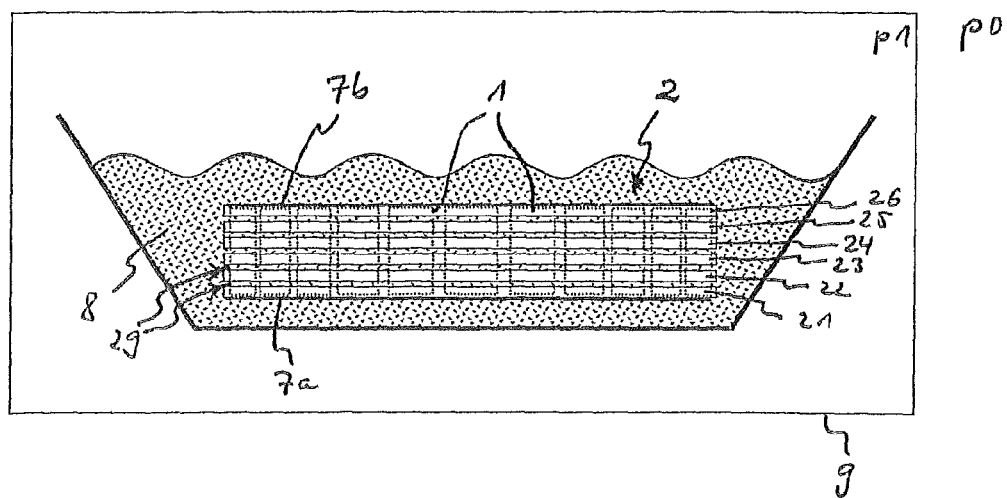
FIG. 9 is a cross-sectional view of one embodiment of an evacuatable chamber in which the substrate body provided with the coated magnets or coated magnetizable bodies and closed off by the adhesive film is impregnated in place by an impregnation resin as described herein.

Referring now to FIG. 9 there is illustrated how the assembly as shown in FIG. 8 is impregnated with an impregnation resin 8, formulated so that in later curing it bonds with the lacquer coating 11 applied to the magnets 1 optimally in creating a high-strength cementation of the magnets 1 in the substrate body 2, which is capable of withstanding even extremely high speeds experienced by the rotor produced therefrom. Impregnating is done, at least temporarily, in an evacuatable chamber 9, for example, at an absolute pressure p1 smaller or equal to 1 hPa, which is reduced as compared to the normal ambient pressure p0 outside of the chamber 9.

Impregnating the assembly can be done at a point in time when the lacquer coating 11 of the magnet 1 is in the A-condition, B-condition or in the C-condition. When the lacquer coating 11 is still not cured, i.e. is still in the A-condition or B-condition, the lacquer coating 11 and the impregnation resin can better bond in their common limiting range, resulting in a highly intensive bond.

When impregnating the assembly, the impregnation resin 8 is able to gain access from without into the interstices 29 between the adjoining metal sheets 21, 22, 23, 24, 25, 26 as well as into the gaps between the coated magnets 1 and the metal sheets 21, 22, 23, 24, 25, 26 so that the impregnation resin is totally impregnated into the assembly, which is thus substantially free of any air inclusions.

Figure 10:
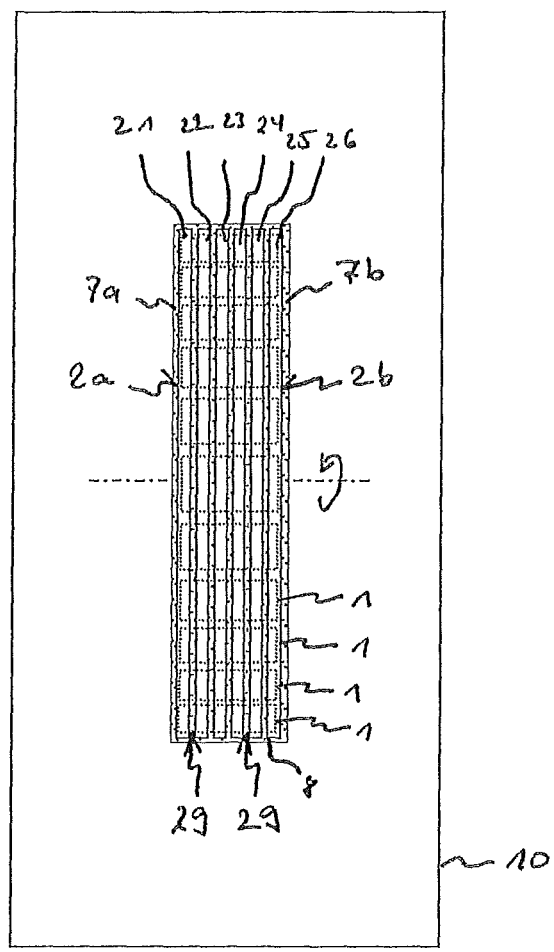
FIG. 10 is a cross-sectional view of one embodiment of a curing oven in which the substrate body fitted with the coated magnets or magnetizable bodies and provided with the adhesive film impregnated with the impregnation resin is cured at an elevated temperature.

After this, the impregnation resin 8—and where curing of the lacquer coating has not already taken place—the lacquer coating 11, are cured. Referring now to FIG. 10 there is illustrated how curing is done in a curing oven 10. In a particular example, curing may be done in two steps in which the impregnated assembly is precured during an optional first curing step at an elevated first temperature of, for example, 50° C. to 100° C. In the first curing step the resulting curing reaction causes the viscosity of the impregnation resin to gradually increase and—because of the resulting cross-linking and the curing action involved—without any thin liquid intermediate condition, thus preventing weepage from the interstices of the assembly. Correctly triggering cross-linking is realized by combining an epoxy-based resin system with accelerated anhydride curing. Such a system experiences just a slight change in viscosity when heated, since curing of the impregnation resin matrix commences at temperatures of approximately 50° C.

In a subsequent optional second step, curing is completed at a second temperature higher than the first, for instance at a temperature ranging from 100° C. to 150° C.

To prevent excessive weepage of the impregnating resin 8 from the interstices 29 as well as from gaps between the magnets 1 and the substrate body 2, the assembly after impregnation can be rotated during curing about an axis R (shown in FIG. 11) until the impregnating resin 8 has sufficiently cured. Rotation can be programmed optionally during the first and optionally during the second step in curing.

Figure 11:
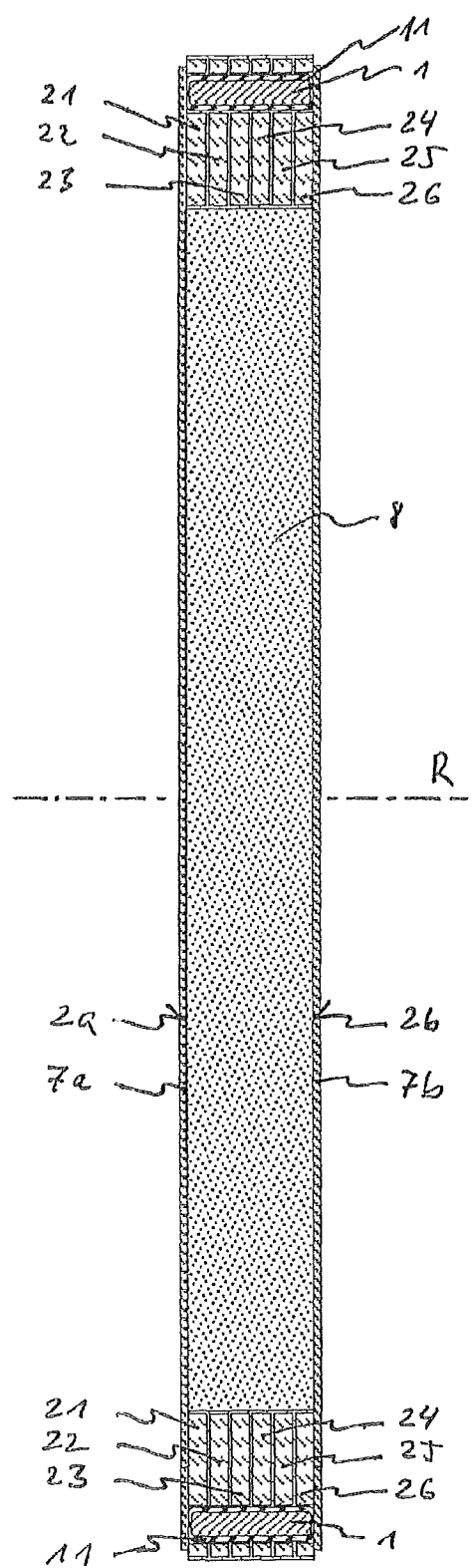
FIG. 11 is a vertical section through the completed bond in a section plane containing the axis of rotation as shown in FIG. 10.

Referring now to FIG. 11 there is illustrated a cross-section through the rotor in its finished condition as taken in the plane of the axis of rotation as shown in FIG. 10. In this view the adhesive films 7a, 7b are still stuck to the front side 2a and rear side 2b respectively of the substrate body 2 which alternatively can be stripped off after impregnation, for example during the first curing step, after the first and before the second curing step or during the second curing step as soon as the impregnation resin 8 has sufficiently set.

Figure 12:
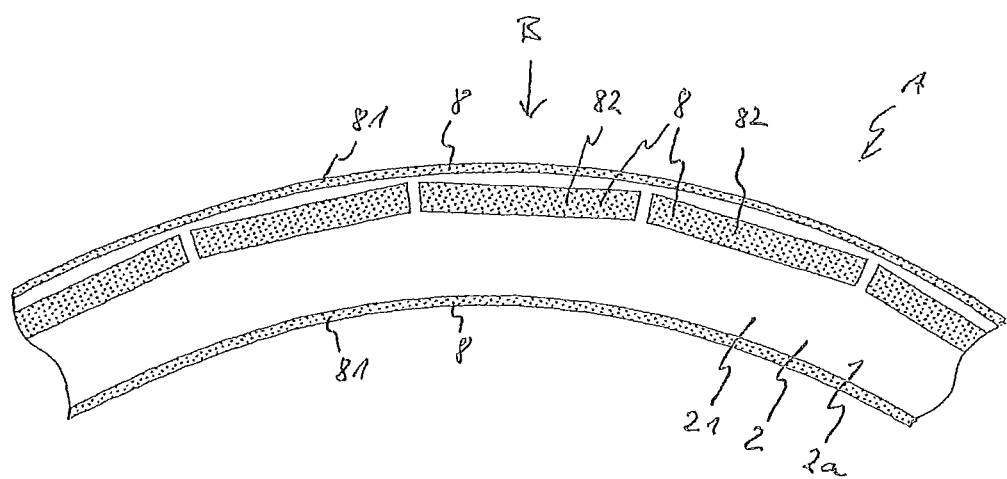
FIG. 12 is a view of section A of the substrate body fitted with the magnets as shown in FIGS. 1, 2, 3, 6 and 7 after removal of the front and rear adhesive films.

Referring now to FIG. 12 there is illustrated the section A as shown in FIGS. 1, 2, 3, 6 and 7 of the substrate body 2 fitted with magnets 1, impregnated with impregnation resin 8 and cured, after having the front and rear adhesive films 7a and 7b stripped off. Whilst, because of the protective adhesive films 7a, 7b the front side 2a and the rear side 2b are not covered by the impregnating resin 8, or only slightly so, a layer 81 of the impregnating resin 8 covers the inner side and outer side of the annular substrate body 2. Further layers 82 of the impregnating resin 8 may cover the magnets 1. These layers 82 result from the impregnating resin 8 having found its way into the interstices between the adhesive films 7a, 7b and the magnets 1.

To prevent excess impregnation resin, still clinging to the magnets 1 after impregnation of the substrate body 2, from forming an unwantedly thick layer, this excess impregnation resin can be thinned off by a thinning agent after impregnation.

The invention having been thus described with reference to certain specific embodiments and examples, it will be clear that these are illustrative, and not limiting of the appended claims.

The invention claimed is:

1. A method for bonding a first bonding partner to a second bonding partner, comprising:
    providing the first bonding partner and the second bonding partner;
    applying to the first bonding partner a coating comprising
        a lacquer composition, comprising
            an epoxy resin mixture, comprising
                10 to 94% by weight, based on the weight of the epoxy resin mixture, of at least one solid epoxy resin with an epoxide number not exceeding 2 Eq/kg,
                1 to 50% by weight, based on the weight of the epoxy resin mixture, of at least one solid multifunctional epoxy resin with an epoxide number >4 Eq/kg, and
                5 to 40% by weight, based on the weight of the epoxy resin mixture, of a phenol and/or cresol novolak with a melting point >30° C.,
            a curing accelerator,
            a silane-based epoxy functional adhesion promoter, and
            a solvent;
    placing the coated first bonding partner in contact with the second bonding partner;
    impregnating the second bonding partner and the lacquer-coated first bonding partner combined with an impregnation resin; and
    curing said impregnation resin, said lacquer coating, or both.

2. The method as set forth in claim 1 wherein said epoxy resin mixture comprises:
    1 to 80% by weight, based on the weight of the epoxy resin mixture, of a solid epoxy resin having an epoxide number <1 Eq/kg, and
    1 to 80% by weight, based on the weight of the epoxy resin mixture, of a solid epoxy resin having an epoxide number ranging from 1 Eq/kg to 2 Eq/kg.

3. The method as set forth in claim 2 wherein said epoxy resin mixture comprises
    40 to 60% by weight, based on the weight of the epoxy resin mixture, of a solid epoxy resin with an epoxide number <1 Eq/kg,
    20 to 40% by weight, based on the weight of the epoxy resin mixture, of a solid epoxy resin having an epoxide number ranging from 1 Eq/kg to 2 Eq/kg;
    10 to 40% by weight, based on the weight of the epoxy resin mixture, of a solid multifunctional epoxy resin having an epoxide number >4 Eq/kg and
    10 to 20% by weight, based on the weight of the epoxy resin mixture, of a phenol and/or cresol novolak with a melting point >30° C.

4. The method as set forth in claim 1, wherein said at least one solid epoxy resin having an epoxide number not exceeding 2 Eq/kg comprises a bisphenol-A and/or bisphenol-F based epoxy resin.

5. The method as set forth in claim 1, wherein said multifunctional epoxide resin with an epoxide number >4 Eq/kg is selected from the group consisting of epoxy phenol novolaks, epoxy cresol novolaks, triglycidyl isocyanurates, and mixtures of two or more of these substances.

6. The method as set forth in claim 1, wherein said curing accelerator comprises tertiary amines or imidazole derivatives.

7. The method as set forth in claim 6 wherein said curing accelerator comprises 2-ethyl-4-imidazole.

8. The method as set forth in claim 1, wherein said percentage of said silane-based epoxy functional adhesion promoter in relation to said epoxy resin mixture is 0.1% by weight to 5% by weight.

9. The method as set forth in claim 8 wherein said percentage of said silane-based epoxy functional adhesion promoter in relation to said epoxy resin mixture is 1% by weight to 3% by weight, based on the weight of the epoxy resin mixture.

10. The method as set forth in claim 1, wherein said silane-based epoxy functional adhesion promoter is selected from the group consisting of γ-glycidyloxypropyltrimethoxysilane and β-(3,4-epoxycyclohexyl)-ethyltrimethoxysilane.

11. The method as set forth in claim 1, wherein said solvent is selected from the group consisting of aliphatic and aromatic hydrocarbons, ethers, esters, glycol ethers, alcohols, ketones, and mixtures thereof.

12. The method as set forth in claim 1, wherein said lacquer composition has a percentage of solids that ranges from 1% by weight to 50% by weight, based upon the weight of the lacquer composition.

13. The method as set forth in claim 12 wherein said percentage of solids of the lacquer composition ranges from 10% by weight to 20% by weight, based upon the weight of the lacquer composition.

14. The method as set forth in claim 1, wherein said lacquer composition additionally comprises at least one corrosion protection additive.

15. The method as set forth in claim 14 wherein said at least one corrosion protection additive comprises zinc phosphate, zinc chromate, or zinc hydroxy phosphite.

16. The method as set forth in claim 1, wherein said lacquer composition further comprises a soluble dyestuff and/or a levelling agent and/or a defoamant.

17. The method as set forth in claim 1, wherein said lacquer composition further comprises a non-metallic filler.

18. The method as set forth in claim 17 wherein said non-metallic filler comprises at least one dispersible pigment and/or a substance selected from the group consisting of silica flour, mica and talcum.

19. The method as set forth in claim 18 wherein said dispersible pigment comprises carbon black and/or rutile and/or a dispersion aid.

20. The method as set forth in claim 18, wherein said dispersible pigment further comprises a rheological additive and/or deposition aid.

21. The method as set forth in claim 20 wherein said rheological additive and/or deposition aid comprises a bentonite or an aerosil.

22. The method as set forth in claim 1, wherein said phenol and/or cresol novolak has a melting point >100° C.

23. The method as set forth in claim 1, wherein at a temperature of 25° C. said impregnation resin has a viscosity ranging from 50 mPa·s to 1000 mPa·s.

24. The method as set forth in claim 23, wherein at a temperature of 25° C. said impregnation resin has a viscosity ranging from 200 mPa·s to 300 mPa·s.

25. The method as set forth in claim 1 wherein said impregnation resin comprises a bisphenol-A epoxy resin that is liquid at a temperature of 20° C., and/or a bisphenol-F epoxy resin that is liquid at a temperature of 20° C.

26. The method as set forth in claim 1, wherein said impregnation resin further comprises an amount of an epoxy-functional thinner effective to reduce the viscosity of the impregnation resin.

27. The method as set forth in claim 1, wherein said impregnation resin further comprises an anhydride curing agent.

28. The method as set forth in claim 27, wherein said anhydride curing agent comprises a thin dicarbonic acid anhydride.

29. The method as set forth in claim 28 wherein said thin dicarbonic acid anhydride is methyl cyclohexane dicarbonic acid anhydride.

30. The method as set forth in claim 1, wherein said impregnation resin further comprises a curing accelerator.

31. The method as set forth in claim 30 wherein said curing accelerator comprises an imidazole derivative and/or a bortrichloride amine system.

32. The method as set forth in claim 1 wherein said impregnating is done at an absolute pressure p1 smaller or equal to 1 hPa.

33. The method as set forth in claim 1, wherein said second bonding partner comprises a recess, and wherein said placing the coated first bonding partner in contact with the second bonding partner comprises inserting said coated first bonding partner at least partly into said recess.

34. The method as set forth in claim 33, wherein said recess comprises an opening passing through the second bonding partner.

35. The method as set forth in claim 34, wherein said opening is closed off at one side before insertion of the first bonding partner.

36. The method as set forth in claim 35, wherein said recess comprises an adhesive film which closes off one side of said opening in the second bonding partner.

37. The method as set forth in claim 33, wherein said placing the coated first bonding partner in contact with the second bonding partner further comprises totally closing off said recess in the second bonding partner after insertion of the first bonding partner and before impregnation.

38. The method as set forth in claim 37, wherein said totally closing off comprises applying an adhesive film over an opening of the recess.

39. The method as set forth in claim 1, further comprising removing any impregnation resin sticking to an outer surface of an assembly comprising the first bonding partner, the second bonding partner and the lacquer coating by flushing of the impregnation resin from the outer surface with a solvent, such that the impregnation resin remains in interstices of the assembly.

40. The method as set forth in claim 39, wherein said interstices include a gap formed between the first bonding partner and the second bonding partner.

41. The method as set forth in claim 39, wherein said second bonding partner comprises a sheet metal laminate.

42. The method as set forth in claim 1 wherein said curing of said impregnation resin, said lacquer, or both comprises pre-curing said first bonding partner, second bonding partner, lacquer coating together with the impregnation resin sticking thereto after impregnation in a first curing step at an elevated first temperature.

43. The method as set forth in claim 42, wherein said elevated first temperature ranges from 50° C. to 100° C.

44. The method as set forth in claim 42, wherein said curing further comprises rotating said first bonding partner, second bonding partner, lacquer coating together with the impregnation resin sticking thereto after impregnation during the first curing step.

45. The method as set forth in claim 42, wherein said curing of said impregnation resin, said lacquer, or both further comprises curing said first bonding partner, second bonding partner, lacquer coating together with the impregnation resin sticking thereto after impregnation in a second curing step at an elevated second temperature which is higher than said elevated first temperature.

46. The method as set forth in claim 45, wherein said elevated second temperature ranges from 100° C. to 150° C.

47. The method as set forth in claim 45, wherein said curing of said impregnation resin, said lacquer, or both further comprises rotating said first bonding partner, second bonding partner, lacquer coating together with the impregnation resin sticking thereto after impregnation during the second curing step.

48. The method as set forth in claim 1, wherein said first bonding partner is a magnet or magnetizable body, and wherein said second bonding partner is a substrate body of a rotor to be produced for a permanent magnet synchronous machine.

49. The method as set forth in claim 1, further comprising reducing the viscosity of the impregnation resin prior to curing by contacting the impregnation resin with an epoxy functional thinner.

* * * * *